(12) United States Patent
Noh et al.

(10) Patent No.: US 10,547,338 B2
(45) Date of Patent: Jan. 28, 2020

(54) METHOD AND APPARATUS FOR OBTAINING CHANNEL INFORMATION IN POLARIZATION DIVISION DUPLEX SYSTEMS

(71) Applicants: ELECTRONICS AND TELECOMMUNICATIONS RESEARCH INSTITUTE, Daejeon (KR); INDUSTRY-UNIVERSITY COOPERATION FOUNDATION SUNMOON UNIVERSITY, Asan-si, Chungcheongnam-do (KR)

(72) Inventors: Gosan Noh, Daejeon (KR); Changyong Shin, Asan-si (KR)

(73) Assignees: ELECTRONICS AND TELECOMMUNICATIONS RESEARCH INSTITUTE, Daejeon (KR); INDUSTRY-UNIVERSITY COOPERATION FOUNDATION SUNMOON UNIVERSITY, Asan-si, Chungcheongnam-Do (KR)

( * ) Notice: Subject to any disclaimer, the term of this patent is extended or adjusted under 35 U.S.C. 154(b) by 270 days.

(21) Appl. No.: 15/581,158

(22) Filed: Apr. 28, 2017

(65) Prior Publication Data
US 2017/0317704 A1   Nov. 2, 2017

(30) Foreign Application Priority Data
Apr. 29, 2016 (KR) .................. 10-2016-0053300

(51) Int. Cl.
*H04W 4/00* (2018.01)
*H04B 1/38* (2015.01)
(Continued)

(52) U.S. Cl.
CPC ............. *H04B 1/38* (2013.01); *H04B 7/0808* (2013.01); *H04B 7/0857* (2013.01); *H04B 7/10* (2013.01);
(Continued)

(58) Field of Classification Search
None
See application file for complete search history.

(56) References Cited

U.S. PATENT DOCUMENTS

| | | | |
|---|---|---|---|
| 8,817,687 B2 | 8/2014 | Yazdan Panah et al. | |
| 2004/0114504 A1* | 6/2004 | Jung | H04L 5/0048 370/203 |
| 2007/0242782 A1 | 10/2007 | Han et al. | |
| 2010/0061223 A1 | 3/2010 | Kim et al. | |
| 2010/0080114 A1* | 4/2010 | Ratnam | H04L 5/0007 370/210 |

(Continued)

FOREIGN PATENT DOCUMENTS

| | | |
|---|---|---|
| JP | 2014-233040 A | 12/2014 |
| KR | 10-1584481 B1 | 1/2016 |

OTHER PUBLICATIONS

J.C. Lin "Least-squares channel estimation assisted by self-interference cancellation for mobile pseudo-random-postfix orthogonal-frequency-division multiplexing applications", IET Commun., 2009, vol. 3, Iss. 12, pp. 1907-1918.

*Primary Examiner* — Zewdu A Beyen
(74) *Attorney, Agent, or Firm* — LRK Patent Law Firm

(57) ABSTRACT

A method and an apparatus for acquiring channel information in a polarization division duplex system. An uplink signal transmitted from a terminal is received, the uplink signal indicating that a null subcarrier is disposed in a first subcarrier overlapped with a second subcarrier including a downlink pilot signal, and a self-interference channel is estimated by using a signal received from the null subcarrier. A signal corresponding to the null subcarrier from the uplink signal is removed, and channel information is acquired by estimating the uplink channel based on estimation results of (Continued)

the self-interference channel and a pilot signal included in the uplink signal from which the null subcarrier is removed.

7 Claims, 10 Drawing Sheets

(51) Int. Cl.
    *H04B 7/08*     (2006.01)
    *H04J 3/06*     (2006.01)
    *H04B 7/10*     (2017.01)
    *H04W 16/12*     (2009.01)
    *H04W 16/24*     (2009.01)

(52) U.S. Cl.
    CPC ............... *H04J 3/06* (2013.01); *H04W 16/12* (2013.01); *H04W 16/24* (2013.01)

(56) References Cited

U.S. PATENT DOCUMENTS

| | | | |
|---|---|---|---|
| 2010/0260078 A1 | 10/2010 | Kim et al. | |
| 2010/0260248 A1* | 10/2010 | Hung | H04L 25/0212 |
| | | | 375/224 |
| 2010/0322160 A1* | 12/2010 | Yeh | H04L 5/023 |
| | | | 370/329 |
| 2011/0110304 A1* | 5/2011 | Kuchi | H04L 5/0023 |
| | | | 370/328 |
| 2015/0271831 A1* | 9/2015 | Wang | H04W 76/14 |
| | | | 370/329 |
| 2015/0341101 A1* | 11/2015 | Park | H04L 5/0048 |
| | | | 370/329 |
| 2016/0135194 A1* | 5/2016 | Kim | H04B 7/022 |
| | | | 370/329 |
| 2016/0301457 A1* | 10/2016 | Liang | H04B 7/0452 |
| 2017/0099127 A1* | 4/2017 | Byun | H04L 5/0051 |

* cited by examiner

×: null subcarrier (Always applied)
×: null subcarrier (Added when CFO is large)

DL

DL

UL

UL (a)                    (b)

×: null subcarrier (Always applied)
×: null subcarrier (Added when CFO is large)

DL

DL

UL

UL (a)            (b)

METHOD AND APPARATUS FOR OBTAINING CHANNEL INFORMATION IN POLARIZATION DIVISION DUPLEX SYSTEMS

CROSS-REFERENCE TO RELATED APPLICATION

This application claims priority to and the benefit of Korean Patent Application No. 10-2016-0053300, filed in the Korean Intellectual Property Office on Apr. 29, 2016, the entire content of which is incorporated herein by reference.

BACKGROUND OF THE INVENTION

1. Field of the Invention

The present invention relates to a method and an apparatus for acquiring channel information in a polarization division duplex system that simultaneously performs downlink and uplink data transmission using a same frequency band.

2. Description of Related Art

A current mobile communication system transmits data only in one direction of downlink or uplink for a given frequency band. In such a system, it is possible to accurately acquire channel information without interference by using pilot signals transmitted from each direction.

However, a system that performs bi-directional communications by using a same frequency bandwidth has been developed, like the polarization division duplex system. In cellular mobile communication, bi-directional communications, i.e., duplexing, is performed to simultaneously support a downlink from a base station to a terminal and an uplink from the terminal to the base station. For the bi-directional communications, two methods of frequency-division duplex (FDD), which divides frequency resources, and time-division duplex (TDD), which divides time resources, are used most frequently.

When bi-directional data transmission is simultaneously performed by using a same frequency bandwidth, it is difficult to accurately acquire bidirectional channel information simultaneously without interference.

SUMMARY OF THE INVENTION

The present invention has been made in an effort to provide a method and an apparatus for acquiring channel information without interference in a system that simultaneously performs bi-directional data transmission by using a frequency bandwidth.

An exemplary embodiment of the present invention provides a channel information acquiring method in a polarization division duplex system, including: receiving an uplink signal transmitted from a terminal, the uplink signal indicating that a null subcarrier is disposed in a first subcarrier overlapped with a second subcarrier including a downlink pilot signal; estimating a self-interference channel by using a signal received from the null subcarrier; removing a signal corresponding to the null subcarrier from the uplink signal; and acquiring channel information by estimating the uplink channel based on estimation results of the self-interference channel and a pilot signal included in the uplink signal from which the null subcarrier is removed.

Herein, a value of "0" may be disposed in the null subcarrier.

A predetermined number of null subcarriers may be additionally disposed at opposite sides with respect to the first subcarrier overlapped with the second subcarrier including the downlink pilot signal. One null subcarrier may be additionally disposed at each of the opposite sides.

When frequency selectivity of the self-interference channel is greater than a predetermined value and a temporal change amount of the self-interference channel is smaller than a predetermined amount, another null subcarrier may be additionally disposed in a symbol in which the null subcarrier is disposed. When the frequency selectivity of the self-interference channel is smaller than the predetermined value and the temporal change amount of the self-interference channel is greater than the predetermined amount, another null subcarrier may be additionally disposed in a first symbol that is different from a second symbol in which the null subcarrier is disposed. When the frequency selectivity of the self-interference channel is greater than the predetermined value and the temporal change amount of the self-interference channel is greater than the predetermined amount, another null subcarrier may be additionally disposed in each of the second symbol in which the null subcarrier is disposed and the first symbol that is different from the second symbol in which the null subcarrier is disposed.

In a time domain, a length of the self-interference channel may not exceed a predetermined maximum length, and the maximum length may have a value that is equal to or smaller than that of a CP (cyclic prefix) that is added into the uplink signal.

An exemplary embodiment of the present invention provides a channel information acquiring method in a polarization division duplex system, including: estimating a self-interference channel based on an uplink signal received from a terminal; and acquiring uplink channel information by estimating an uplink channel by using a final estimate of a self-interference channel and a known uplink pilot signal, when a channel estimation number is a predetermined number or an estimate of the self-interference channel is smaller than a predetermined value.

The estimating may include acquiring an average estimate of the self-interference channel and the uplink channel for subcarriers corresponding to a window having a predetermined size by applying the window to the uplink signal.

The estimating may include acquiring an estimate of a self-interference channel having a predetermined sequence based on the average estimate under a condition that a length of the self-interference channel does not a predetermined length.

In this case, in the acquiring of the uplink channel information, when the estimate of the self-interference channel having the predetermined sequence is smaller than a predetermined value or the channel estimation number is a predetermined number, uplink channel information may be acquired by estimating an uplink channel by using a final estimate of the self-interference channel and an uplink pilot signal.

The self-interference channel and the uplink channel may be estimated by using a first symbol having a predetermined sequence in a downlink resource block that occupies a same time and frequency bandwidth as a second symbol having a predetermined sequence in which a pilot signal exists in an uplink resource block.

An exemplary embodiment of the present invention provides a receiver for acquiring channel information in a polarization division duplex system, including: a signal receiving processor configured to receive an uplink signal from a transmitting apparatus, the uplink signal indicating that a null subcarrier is disposed in a first subcarrier overlapped with a second subcarrier including a downlink pilot signal; a self-interference channel estimation unit configured to estimate a self-interference channel by using a signal received from the null subcarrier; a null subcarrier remover configured to remove a signal corresponding to the null subcarrier from the uplink signal; and a channel estimation and equalizer configured to acquire channel information by estimating the uplink channel based on estimation results of the self-interference channel and a pilot signal included in the uplink signal from which the null subcarrier is removed.

A predetermined number of null subcarriers may be additionally disposed at opposite sides with respect to the first subcarrier overlapped with the second subcarrier including the downlink pilot signal.

The signal receiving processor may include: an RF (radio frequency) unit configured to receive uplink signals through a receiving antenna; a first signal converter configured to convert the received signals into digital signals; a CP remover configured to remove CPs (cyclic prefixes) from the digital signals; a second signal converter configured to convert the CP-removed signals into parallel signals; and a DFT (discrete Fourier transform) unit configured to convert the CP-removed digital signals into signals of a frequency domain through DFT, and to transmit signals corresponding to a null subcarrier among the uplink signals that are converted into the signals of the frequency domain, to the self-interference channel estimation unit.

An exemplary embodiment of the present invention provides a receiver for acquiring channel information in a polarization division duplex system, including: a DFT (discrete Fourier transform) unit configured to convert data to be transmitted into a data signal of a frequency domain by performing DFT for the data, and to map a frequency-converted signal of the data to a subcarrier; a null subcarrier insertion unit configured to process a first carrier that overlaps a second subcarrier in which a downlink pilot signal exists as a null subcarrier; an IDFT unit configured to convert a signal to be transmitted into a time domain signal by performing IDFT (inverse DFT) when signals are allocated to all subcarriers; and a signal transmitting processor configured to transmit the time domain signal through an antenna.

A predetermined number of null subcarriers may be additionally disposed at opposite sides with respect to the first subcarrier overlapped with the second subcarrier including the downlink pilot signal. When frequency selectivity of the self-interference channel is greater than a predetermined value and a temporal change amount of the self-interference channel is smaller than a predetermined amount, another null subcarrier may be additionally disposed in a symbol in which the null subcarrier is disposed, when the frequency selectivity of the self-interference channel is smaller than the predetermined value and the temporal change amount of the self-interference channel is greater than the predetermined amount, another null subcarrier may be additionally disposed in a first symbol that is different from a second symbol in which the null subcarrier is disposed, and when the frequency selectivity of the self-interference channel is greater than the predetermined value and the temporal change amount of the self-interference channel is greater than the predetermined amount, another null subcarrier may be additionally disposed in each of the second symbol in which the null subcarrier is disposed and the first symbol that is different from the second symbol in which the null subcarrier is disposed.

DETAILED DESCRIPTION OF THE EMBODIMENTS

Figure 1:
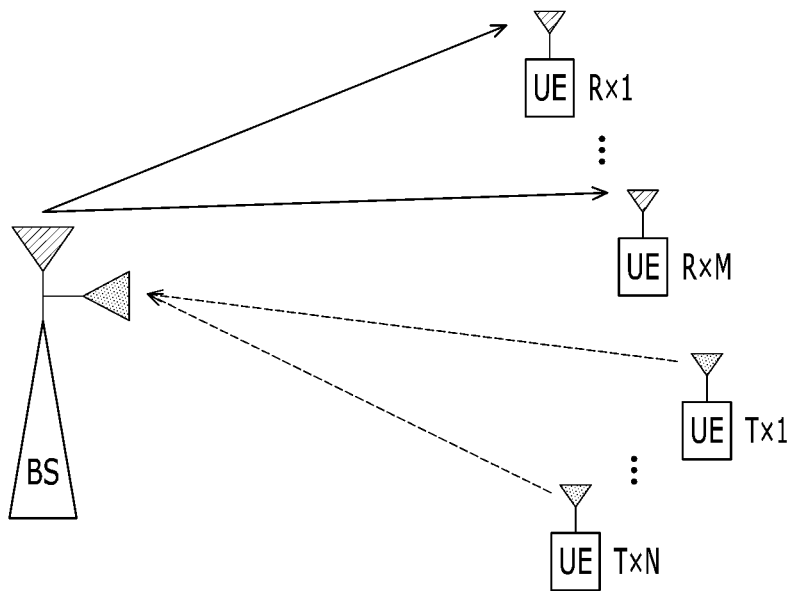
FIG. 1 illustrates a network environment of a polarization division duplex system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In the specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and it may include entire or partial functions of the MT, the MS, the AMS, the HR-MS, the SS, the PSS, the AT, and the UE.

Further, a base station BS may designate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) for functioning as the base station, a relay node (RN) for functioning as the base station, an advanced relay station (ARS) for functioning as the base station, a high reliability relay station (HR-RS) for functioning as the base station, or a small base station (such as a femto BS, a home node B (HNB), a home eNodeB (HeNB), a pico BS, a macro BS, or a micro BS), and it may include entire or partial functions of the ABS, nodeB, eNodeB, AP, RAS, BTS, MMR-BS, RS, RN, ARS, HR-RS, and small base station.

Hereinafter, a channel information acquiring method and apparatus according to an exemplary embodiment of the present invention will be described with the accompanying drawings.

FIG. 1 illustrates a network environment of a polarization division duplex system.

In the polarization division duplex system, a base station BS uses a dual-polarized antenna to simultaneously perform downlink data transmission by using first polarization and uplink data receipt by using second polarization. For example, as shown in FIG. 1, the base station BS performs the downlink data transmission with terminals UE R×1~UE R×M by using the first polarization and performs the uplink data receipt with terminals UE T×1~UE T×M by using the second polarization.

In this case, the downlink data communication and the uplink data communication are simultaneously performed by sharing one frequency bandwidth. Particularly, the downlink may use an orthogonal frequency division multiple access (OFDMA) method and the uplink may use a single carrier frequency division+multiple access (SC-FDMA) method, in order to allow long term evolution (LTE) to be compatible with LTE-advanced (LTE-A).

Figure 2:
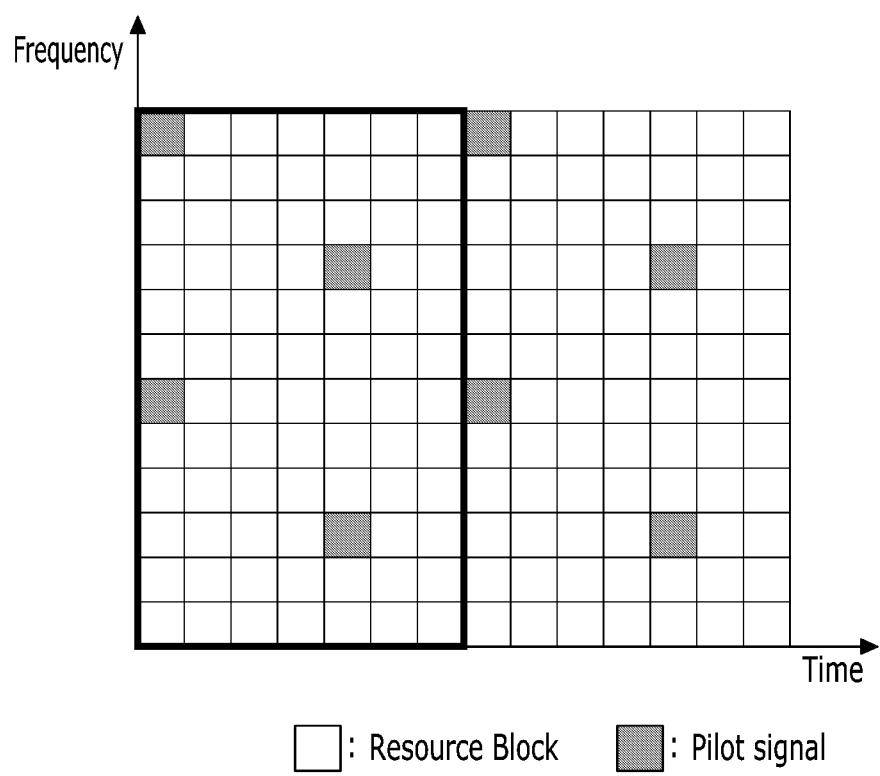
FIG. 2 illustrates an example of disposition of downlink pilot signals.

FIG. 2 illustrates an example of disposition of downlink pilot signals.

In the case of downlink, as shown in FIG. 2, pilot signals may be disposed. Specifically, one resource block includes seven symbols in view of time, and 12 subcarriers for each symbol in view of frequency. One pilot signal is disposed for every 6 consecutive subcarriers in a first symbol (OFDMA, symbol) and a fifth symbol among the symbols (OFDMA symbols) of the resource block, FIG. 3 illustrates an example of disposition of uplink pilot signals.

Figure 3:
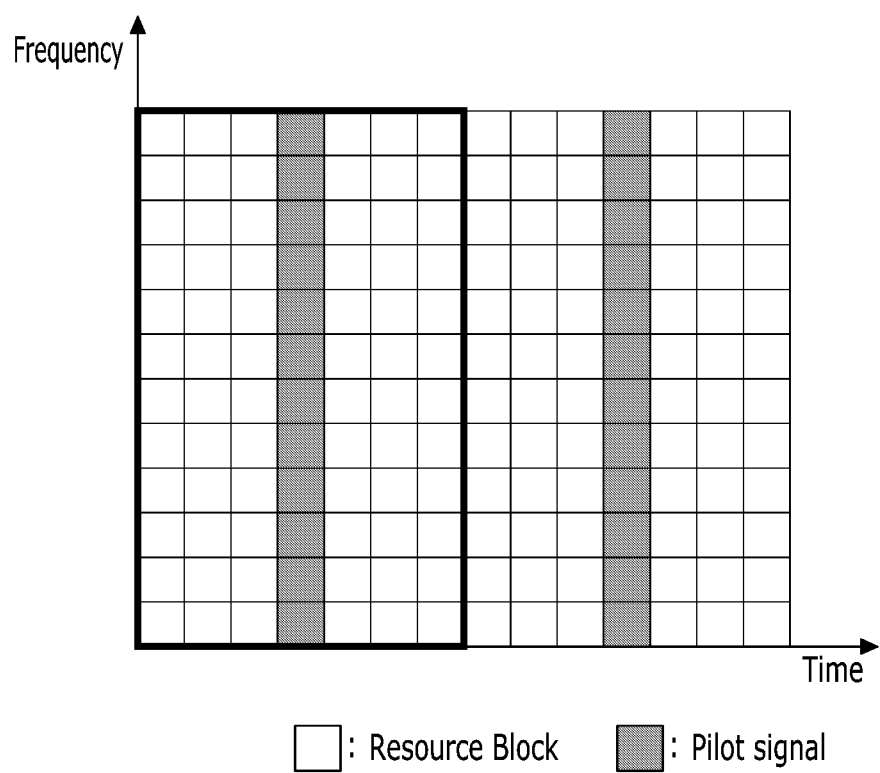
FIG. 3 illustrates an example of disposition of uplink pilot signals.

In the case of uplink, as shown in FIG. 3, pilot signals may be disposed. Specifically, a resource block is formed to have a same structure as the downlink, and pilot signals may be disposed in all of the 12 subcarriers of a fourth symbol among the symbols (SC-FDMA symbols) of the resource block.

A signal $Y^{(n,i)}(k)$ on a $k^{th}$ subcarrier of an symbol of an $n^{th}$ resource block in a base station of the polarization division duplex system illustrated in FIG. 1 may be indicated by Equation 1.

$$Y^{(n,i)}(k)=H_{SI}^{(n)}(k)X_D^{(n,i)}(k)+H_U^{(n)}(k)X_U^{(n,i)}(k)+N^{(n,i)}(k) \quad \text{<Equation 1>}$$

Herein, $H_{SI}^{(n)}(k)$ indicates a self-interference channel from a transmitter to a receiver of the base station for the $n^{th}$ resource block, and $X_D^{(n,i)}(k)$ indicates a downlink signal transmitted to the $k^{th}$ subcarrier of the $i^{th}$ symbol of the $n^{th}$ resource block. $H_U^{(n)}(k)$ indicates an uplink channel from the terminal to the base station for the $n^{th}$ resource block, and $X_U^{(n,i)}(k)$ indicates an uplink signal transmitted to the $k^{th}$ subcarrier of the $i^{th}$ symbol of the $n^{th}$ resource block. $N^{(n,i)}(k)$ indicates receipt noise on the $k^{th}$ subcarrier of the $i^{th}$ symbol of the $n^{th}$ resource block.

In this case, even though most of visible ray components of a self-interference signal are removed through polarization division, a received power of $H_{SI}^{(n)}(k)X_D^{(n,i)}(k)$ corresponding to the self-interference signal that generally remains is much larger than a received power of $H_U^{(n)}(k)X_U^{(n,i)}(k)$ corresponding to a user-transmitting signal.

In exemplary embodiments of the present invention, channel information is acquired without interference such as self-interference.

First, a first exemplary embodiment of the present invention will be described. In the first exemplary embodiment of the present invention, self-interference channel information is acquired by employing a channel estimation scheme using an uplink null subcarrier.

Figure 4:
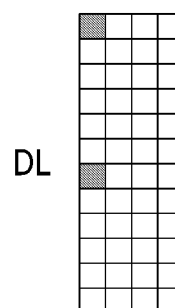
FIG. 4 and FIG. 5 illustrate examples of dispositions of uplink null subcarriers according to a first exemplary embodiment of the present invention.
Figure 4:
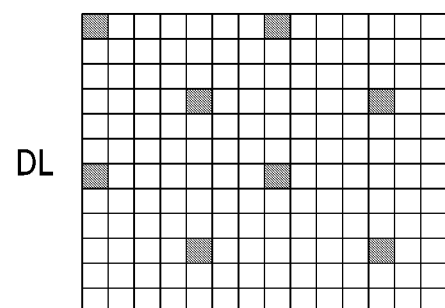
Figure 4:
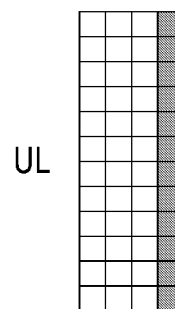
Figure 4:
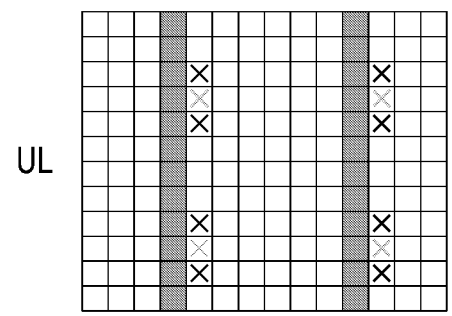
Figure 5:
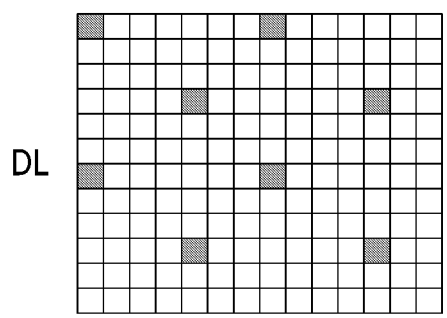
Figure 5:
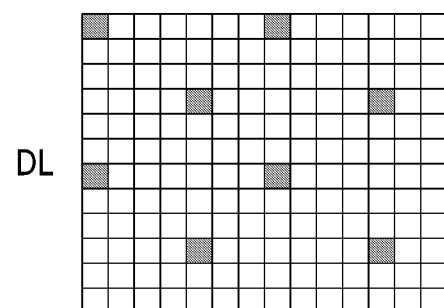
Figure 5:
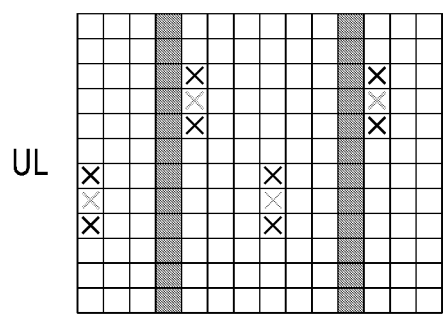
Figure 5:
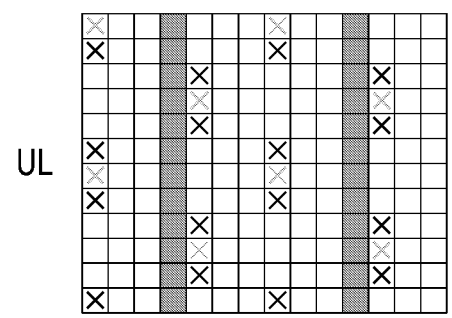

FIG. 4 and FIG. 5 illustrate examples of dispositions of uplink null subcarriers according to a first exemplary embodiment of the present invention.

In the first exemplary embodiment of the present invention, the self-interference channel information is acquired by accurately estimating the self-interference channel without interference by an uplink signal. Next, the self-interference signal is removed from a signal received by using the estimated self-interference channel information, and then uplink channel information is acquired from the signal from which the self-interference signal is removed by using the already-known uplink pilot signal.

For this purpose, as shown in FIG. 4 and FIG. 5, when the uplink signal is transmitted, in a corresponding resource block, a corresponding subcarrier that overlaps the subcarrier including the downlink pilot signal is transmitted while no data is loaded therein. As such, when an uplink signal is transmitted, a subcarrier transmitted while no information is loaded therein is referred to as an "uplink null subcarrier."

In this case, an uplink subcarrier that overlaps a subcarrier of the downlink pilot signal is disposed as a null subcarrier.

In this case, when a carrier frequency offset (CFO) is large, orthogonality between subcarriers is broken to generate interference (intercarrier interference) between the subcarriers. In this case, signal information on adjacent subcarriers is also required for accurate channel estimation. However, transmitting the uplink signal while leaving many adjacent subcarriers blank to obtain these information results in a serious waste of radio resources. Accordingly, in the exemplary embodiment of the present invention, only a set number of adjacent subcarriers, e.g., a small number of subcarriers adjacent to opposite sides based on subcarriers through which downlink pilots are transmitted, are transferred while being left empty, in consideration of efficiency of radio resource utilization, estimation of precise self-interference channel, and interference between subcarriers by CFO. For example, as illustrated in FIG. 4 and FIG. 5, the subcarriers through which the downlink pilots are transmitted may be disposed as null subcarriers as indicated by light "x," and only each one subcarrier adjacent to opposite subcarriers around these subcarriers may be transmitted while being additionally left empty as indicated by dark "x."

When both of frequency selectivity and temporal change of a self-interference channel are small, uplink null subcarriers may be disposed as indicated by light "x" in (a) of FIG. 4, in order to improve estimation accuracy of the self-interference channel and to increase utilization efficiency of radio resources. However, in the case that a CFO of the uplink signal or the self-interference signal is large, the uplink null subcarriers may be additionally disposed as indicated by dark "x" in (a) of FIG. 4.

In contrast, when the temporal change of the self-interference channel is small, but the frequency selectivity is large, the uplink null subcarriers may be disposed as indicated by light "x" in (b) of FIG. 4. In this case, when the CFO of the uplink signal or the self-interference signal is large, the uplink null subcarriers may be additionally disposed as indicated by dark "x" in (b) of FIG. 4.

When the temporal change of the self-interference channel is small, but the frequency selectivity is large, the uplink null subcarriers may be disposed as indicated by light "x" in (a) of FIG. 5. Herein, in the case that the CFO of the uplink signal or the self-interference signal is large, the uplink null subcarriers may be additionally disposed as indicated by dark "x" in (a) of FIG. 5.

In addition, when both frequency selectivity and temporal change of the self-interference channel are large, the uplink null subcarriers may be disposed as indicated by light "x" in (b) of FIG. 5. In this case, when the CFO of the uplink signal or the self-interference signal is large, the uplink null subcarriers may be additionally disposed as indicated by dark "x" in (b) of FIG. 5.

In other words, when the frequency selectivity of the self-interference channel is greater than a predetermined value and a temporal change amount of the self-interference channel is smaller than a predetermined amount, other null subcarriers are additionally disposed ((b) of FIG. 4) in the symbol ((a) of FIG. 4) in which the subcarriers are disposed. In addition, when the frequency selectivity of the self-interference channel is smaller than the predetermined value and the temporal change amount of the self-interference channel is greater than the predetermined amount, other null subcarriers are additionally disposed ((a) of FIG. 5) in a symbol that is different from the symbol ((a) of FIG. 4) in which the subcarriers are disposed. When the frequency selectivity of the self-interference channel is greater than the predetermined value and the temporal change amount of the self-interference channel is greater than the predetermined amount, other null subcarriers are additionally disposed ((b) of FIG. 5) in the symbol ((a) of FIG. 4) in which the subcarriers are disposed and the symbol that is different from the symbol in which the subcarriers are disposed.

Figure 6:
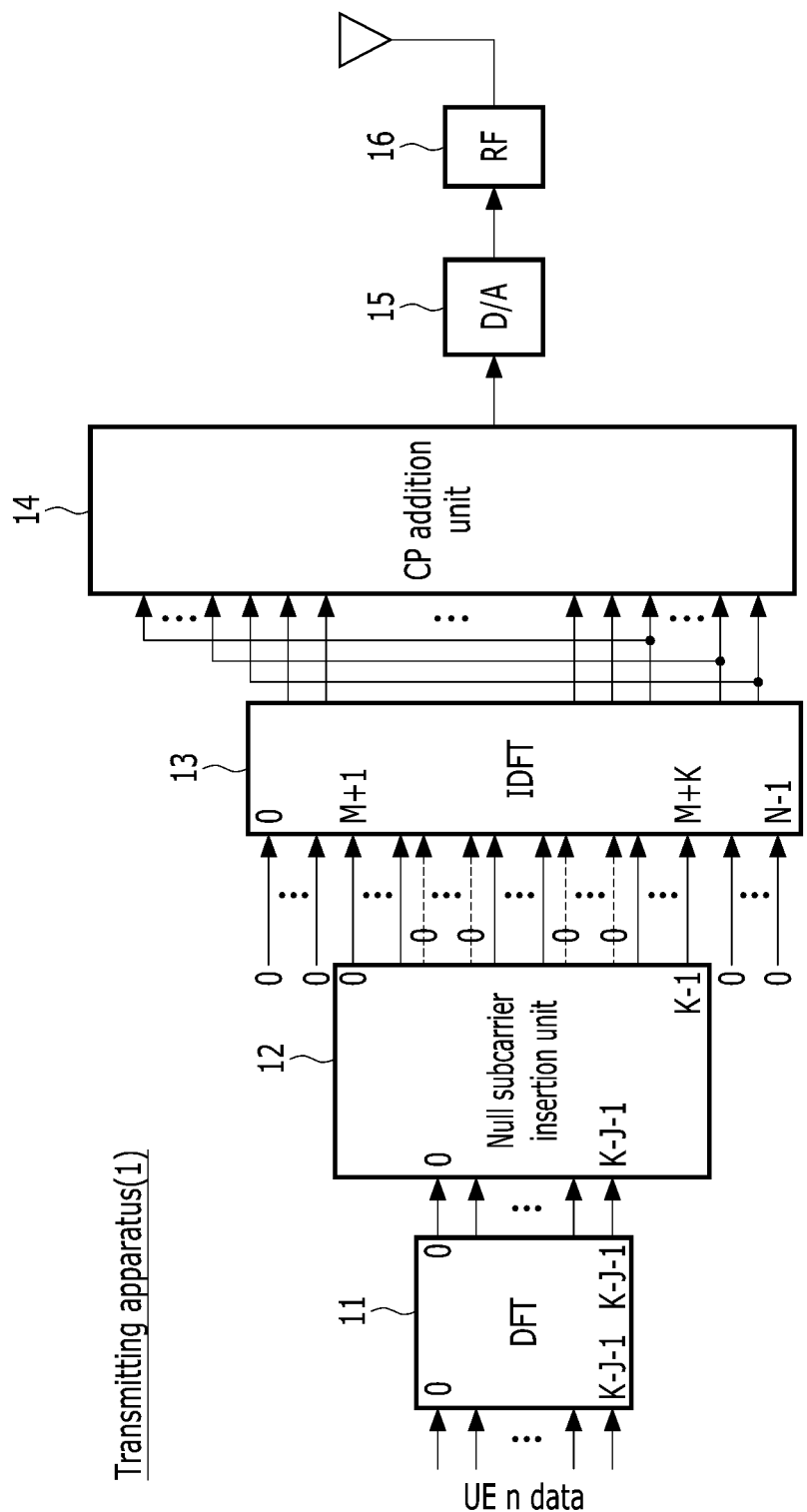
FIG. 6 illustrates a structure of a transmitting apparatus according to the first exemplary embodiment of the present invention.
Figure 7:
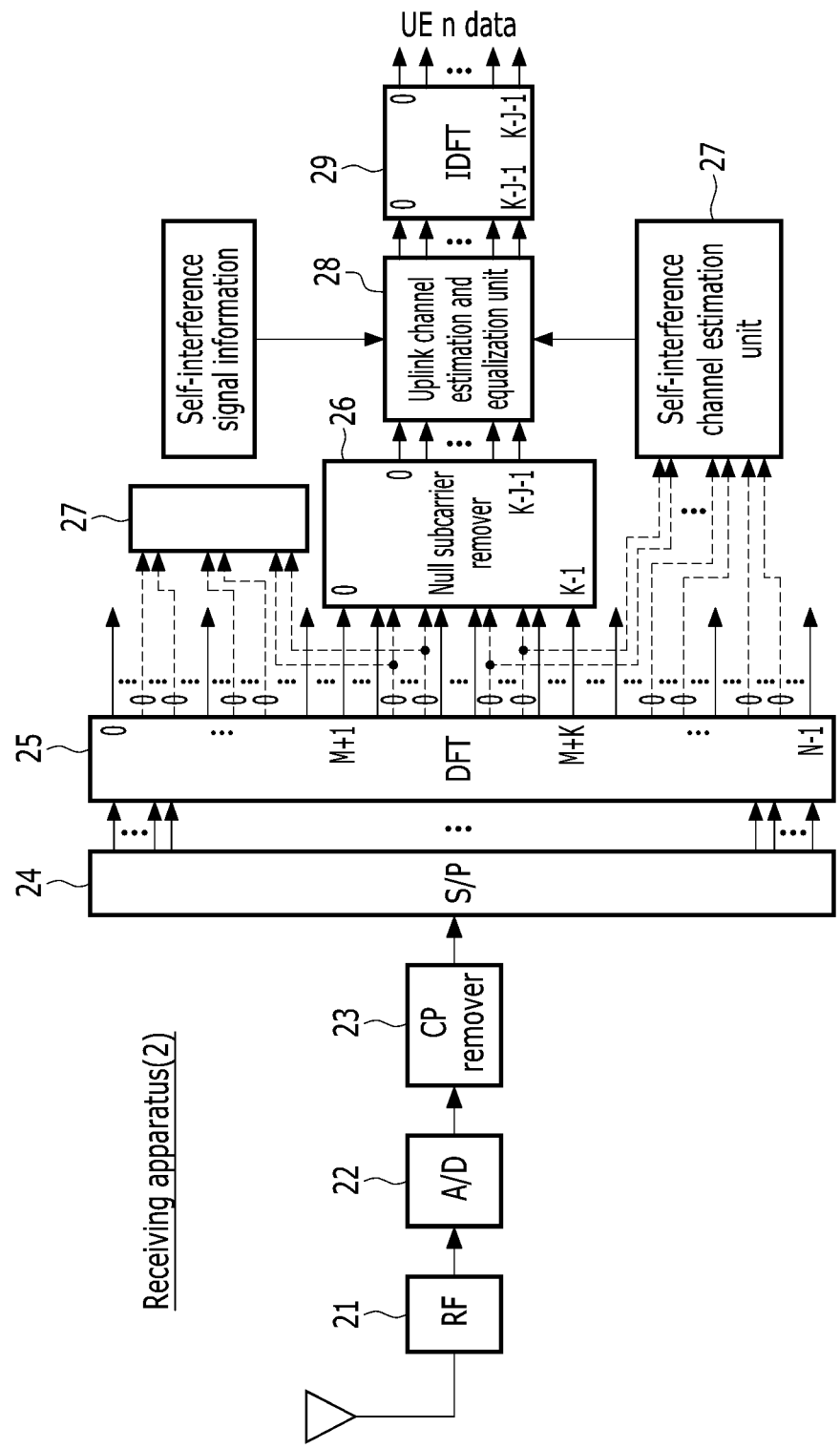
FIG. 7 illustrates a structure of a receiving apparatus according to the first exemplary embodiment of the present invention.

A structure of a transmitting apparatus and a receiving apparatus in the case of using such uplink null subcarriers is illustrated in FIG. 6 and FIG. 7.

FIG. 6 illustrates a structure of a transmitting apparatus according to the first exemplary embodiment of the present invention, and FIG. 7 illustrates a structure of a receiving apparatus according to the first exemplary embodiment of the present invention.

Herein, a structure of a device for a localized allocation method in which consecutive subcarriers are allocated to each user, i.e., a mobile station, is illustrated. However, the same structure can be applied to a distributed allocation method of subcarriers distributed to terminals by simply changing subcarrier indexes. The exemplary embodiment of the present invention has been described based on the localized allocation method in which the consecutive subcarriers are allocated to the mobile station, but the present invention is not limited thereto.

According to the exemplary embodiment of the present invention, the transmitting apparatus (e.g., terminal) 1, as shown in FIG. 6, includes a DFT (discrete Fourier transform) unit 11, a null subcarrier insertion unit 12, an IDFT (inverse DFT) unit 13, a CP (cyclic prefix) addition unit 14, a signal converter (D/A: digital to analog converter) 15, and an RF (radio frequency) unit 16.

The DFT unit 11 converts target data to be transmitted into a data signal of a frequency domain by performing DFT on the data, and maps the frequency-converted signal of the data transmitted to a subcarrier.

The null subcarrier insertion unit 12 processes a first subcarrier (hereinafter, for better comprehension and ease of description, referred to as an uplink subcarrier in which a downlink pilot exists) that overlaps with a second subcarrier through which a downlink pilot signal is transmitted, as a null subcarrier. In other words, a value of "0" is allocated to the uplink subcarrier through which the downlink pilot is transmitted. In addition, the null subcarrier insertion unit 12 may allocate the value of "0" to a small number of subcarriers adjacent to opposite sides of the uplink subcarrier through which the downlink pilot is transmitted. Herein, allocation of the value of "0" includes transmission of a corresponding subcarrier while no data is loaded therein.

When signals are allocated to all of the subcarriers, the IDFT unit 13 performs IFFT to convert signals to be transmitted into time domain signals. The CP addition unit 14 adds a CP into a signal outputted from the IDFT unit 13. The signal converter 15 converts the signal added with the CP into an analog signal, and the RF unit 16 processes the analog signal by using a wireless frequency signal and transmits it through an antenna. Herein, the IDFT unit 13, the CP addition unit 14, the signal converter 15, and the RF unit 16 may be collectively referred to as a "signal transmitting processor."

An operation of the transmitting apparatus 1 having such a structure will be described later.

An $n^{th}$ user, e.g., a terminal, transmits data by using K subcarriers. In this case, it is assumed that there is a subcarrier in which J interested downlink pilots exist in a subcarrier band allocated to a terminal, and subcarriers corresponding to the J downlink pilots must be left empty, and thus data is transmitted by using K−J subcarriers. Accordingly, K−J data are converted into a data signal of a frequency domain by performing a K−J point DFT on the K−J data, to map a frequency-converted signal of data to be transmitted to $(M+1)4^{th}$ to $(M+K)4^{th}$ subcarriers allocated to the $n^{th}$ terminal among all N subcarriers.

In this case, the value of "0" is allocated to a subcarrier that overlaps a subcarrier in which J downlink pilot signals of a subcarrier band allocated to a terminal exist, and frequency-converted signals of data to be transmitted are sequentially allocated to other subcarriers. In addition, the value of "0" is allocated to other subcarriers that are not allocated to the terminal among all the N subcarriers.

As such, when the signal is allocated to all the subcarriers, a signal to be transmitted is converted into a time domain signal by performing an N point IDFT (inverse DFT). Then, the CP is added into the signal, and it is converted into an analog signal to transmit it through an antenna.

According to an exemplary embodiment of the present invention, a receiving apparatus (e.g., base station) 2, as shown in FIG. 7, includes an RF unit 21, a first signal converter 22, a CP remover 23, a second signal converter 24, a DFT unit 25, a null subcarrier remover 26, a self-interference channel estimation unit 27, an uplink channel estimation and equalization unit 28, and an IDFT unit 29.

The RF unit 21 of the receiving apparatus 2 simultaneously receives uplink signals transmitted from each terminal, the first signal converter 22 converts the received signals into digital signals, and the CP remover 23 receives the CP from the digital signals. The second signal converter 24 converts the CP-removed signals into parallel signals to output them to the DFT unit 25.

The DFT unit 25 converts the CP-removed digital signals into frequency-domain signals through the DFT, and transmits signals corresponding to the null subcarrier among the uplink signals of each terminal to the self-interference channel estimation unit 27. Herein, the RF unit 21, the first signal converter 22, the CP remover 23, the second signal converter 24, and DFT unit 25 are collectively referred to as a "signal receiving processor."

The self-interference channel estimation unit 27 estimates a self interference channel based on a signal corresponding to the null subcarrier, and transmits estimated self-interference channel information to the uplink channel estimation and equalizer 28.

The null subcarrier remover 26 removes the null subcarrier from the uplink signal of the frequency domain outputted from the DFT unit 25, and outputs it to the uplink channel estimation and equalizer 28. Specifically, a signal block of a frequency domain having a K−J size is formed by removing signals corresponding to J uplink null subcarriers of each terminal from the signals converted into the frequency domain, and sequentially collecting signals corresponding to other subcarriers, to be transferred to the uplink channel estimation and equalizer 28. Herein, a downlink symbol that operates as a self-interference signal transmitted by using a same frequency bandwidth for a corresponding symbol period is also transferred to the uplink channel estimation and equalizer 28.

The uplink channel estimation and equalizer 28 acquires uplink channel information by estimating an uplink channel by using self-interference channel information transferred from the self-interference channel estimation unit 27, downlink symbol information transmitted from self-interference signal information, and the already-known uplink pilot signal obtained from the uplink signal outputted from the OFT unit 25. Further, the uplink channel estimation and equalizer 28 performs equalization on the uplink signal received from the frequency domain by using uplink channel information.

In addition, it is assumed that all resource blocks are allocated to the terminals, a total number of the terminals is P, and positions of the uplink null subcarrier of each terminal are indicated as $\{k_1, k_2, \ldots, k_P\}$.

When it is assumed that a maximum length of the self-interference channel does not exceed L in the time domain, the self-interference channel $\hat{h}_{SI}=[\hat{h}_{SI}(0) \; \hat{h}_{SI}(1) \ldots \hat{h}_{SI}(L-1)]^T$ estimated in the time domain may be indicated as Equation 4. Particularly, an upper limit L of the self-interference channel length in an actual system may be set to be equal to or smaller than a length of the CP. Accordingly, the self-interference channel $\hat{H}_{SI}^{(total)}=[\hat{H}_{SI}(0) \; \hat{H}_{SI}(1) \ldots \hat{H}_{SI}(N-1)]^T$ of the finally estimated frequency domain may be indicated as Equation 7.

$$\hat{h}_{SI} = A\hat{H}_{SI}^{(partial)} \qquad \langle\text{Equation 4}\rangle$$

$$\hat{H}_{SI}^{(partial)} = \left[ \hat{H}_{SI}^{(1)}(k_1) \; \hat{H}_{SI}^{(2)}(k_2) \; \ldots \; \hat{H}_{SI}^{(P)}(k_P) \right]^T \qquad \langle\text{Equation 5}\rangle$$

$$A = \begin{bmatrix} 1 & 1 & \ldots & 1 \\ e^{j2\pi k_1/N} & e^{j2\pi k_2/N} & \ldots & e^{j2\pi k_P/N} \\ \vdots & \vdots & \vdots & \vdots \\ e^{j2\pi(L-1)k_1/N} & e^{j2\pi(L-1)k_2/N} & \ldots & e^{j2\pi(L-1)k_P/N} \end{bmatrix} \qquad \langle\text{Equation 6}\rangle$$

$$\hat{H}_{SI}^{(total)} = B\hat{h}_{SI} = BA\hat{H}_{SI}^{(partial)} \qquad \langle\text{Equation 7}\rangle$$

$$B = \begin{bmatrix} 1 & 1 & \ldots & 1 & 1 \\ 1 & e^{-j2\pi/N} & \ldots & e^{-j2\pi(L-2)/N} & e^{-j2\pi(L-1)/N} \\ 1 & e^{-j4\pi/N} & \ldots & e^{-j4\pi(L-2)/N} & e^{-j4\pi(L-1)/N} \\ \vdots & \vdots & \vdots & \vdots & \vdots \\ 1 & e^{-j2(N-1)\pi/N} & \ldots & e^{-j2(N-1)\pi(L-2)/N} & e^{-j2(N-1)\pi(L-1)/N} \end{bmatrix} \qquad \langle\text{Equation 8}\rangle$$

The IDFT unit 19 performs the IDFT on the equalized signal outputted from the uplink channel estimation and equalizer 28 to restore transmitted data of each terminal. Particularly, the IDFT unit 19 performs the K−J point IDFT on the equalized signal to restore the data.

Hereinafter, an operation of the receiving apparatus 2 having such a structure will be described.

For convenience of description, it is assumed that one uplink resource block is allocated to each terminal (i.e., an $n^{th}$ resource block is allocated to an $n^{th}$ terminal), and a self-interference channel uses one uplink null subcarrier that exists in a first symbol for each resource block since all of frequency selectivity, temporal change, and CFO are small.

In consideration of Equation 1, a signal received in a subcarrier corresponding to a null subcarrier that exists on the first symbol may be indicated as Equation 2.

$$Y^{(n,1)}(k)=H_{SI}^{(n)}(k)R_D^{(n,1)}(k)+N^{(n,1)}(k) \qquad \text{<Equation 2>}$$

Herein $R_D^{(n,1)}(k)$ indicates a pilot signal that exists on a $k^{th}$ subcarrier of the first symbol of an $n^{th}$ resource block.

When a zero-forcing method is used, an estimated self-interference channel $\hat{H}_{SI}^{(n)}(k)$ of the $n^{th}$ resource block may be indicated as Equation 3.

$$\hat{H}_{SI}^{(n)}(k) = \frac{Y^{(n,1)}(k)}{R_D^{(n,1)}(k)} \qquad \langle\text{Equation 3}\rangle$$

Meanwhile, a received signal $Y^{(n,4)}(k)$ of a base station for a $4^{th}$ symbol of an $n^{th}$ resource block may be indicated as Equation 9.

$$Y^{(n,4)}(k)=H_{SI}^{(n)}(k)X_D^{(n,4)}(k)+H_U^{(n)}(k)P_U^{(n,4)}(k)+N^{(n,4)}(k) \qquad \text{<Equation 9>}$$

In this case, the received signal $Y^{(n,4)}(k)$ of the base station of the frequency domain for the $4^{th}$ symbol of the $n^{th}$ resource block in which the uplink pilot signal of the $n^{th}$ terminal exists may be indicated as Equation 10.

$$Y^{(n,4)}(k)=H_{SI}^{(n)}(k)X_D^{(n,4)}(k)+H_U^{(n)}(k)P_U^{(n,4)}(k)+N^{(n,4)}(k) \qquad \text{<Equation 10>}$$

An estimate $\hat{H}_{SI}^{(n)}(k)$ of $H_{SI}^{(n)}(k)$ may be obtained from $\hat{H}_{SI}^{(total)}$ of Equation 7, and a signal $X_D^{(n,4)}(k)$ transmitted by the base station itself is known. Accordingly, the estimate $\hat{H}_U^{(n)}(k)$ of the frequency domain of the uplink channel is obtained as Equation 11 by using the known uplink pilot $R_U^{(n,4)}(k)$ and the zero-forcing method.

$$\hat{H}_U^{(n)}(k) = \frac{Y^{(n,4)}(k) - \hat{H}_{SI}^{(n)}(k)X_D^{(n,4)}(k)}{R_U^{(n,4)}(k)} \qquad \langle\text{Equation 11}\rangle$$

Hereinafter, a second exemplary embodiment of the present invention will be described. In the second exemplary embodiment of the present invention, downlink channel information is acquired by using an iterative, channel estimation method.

In the case of using an uplink null subcarrier, estimation performance of a self-interference channel and an uplink channel may be improved, but an uplink radio resource may be wasted. Accordingly, in the second exemplary embodiment of the present invention, channel information is acquired by using the iterative channel estimation method in order to prevent a waste of the radio resource while maintaining channel estimation accuracy.

Figure 8:
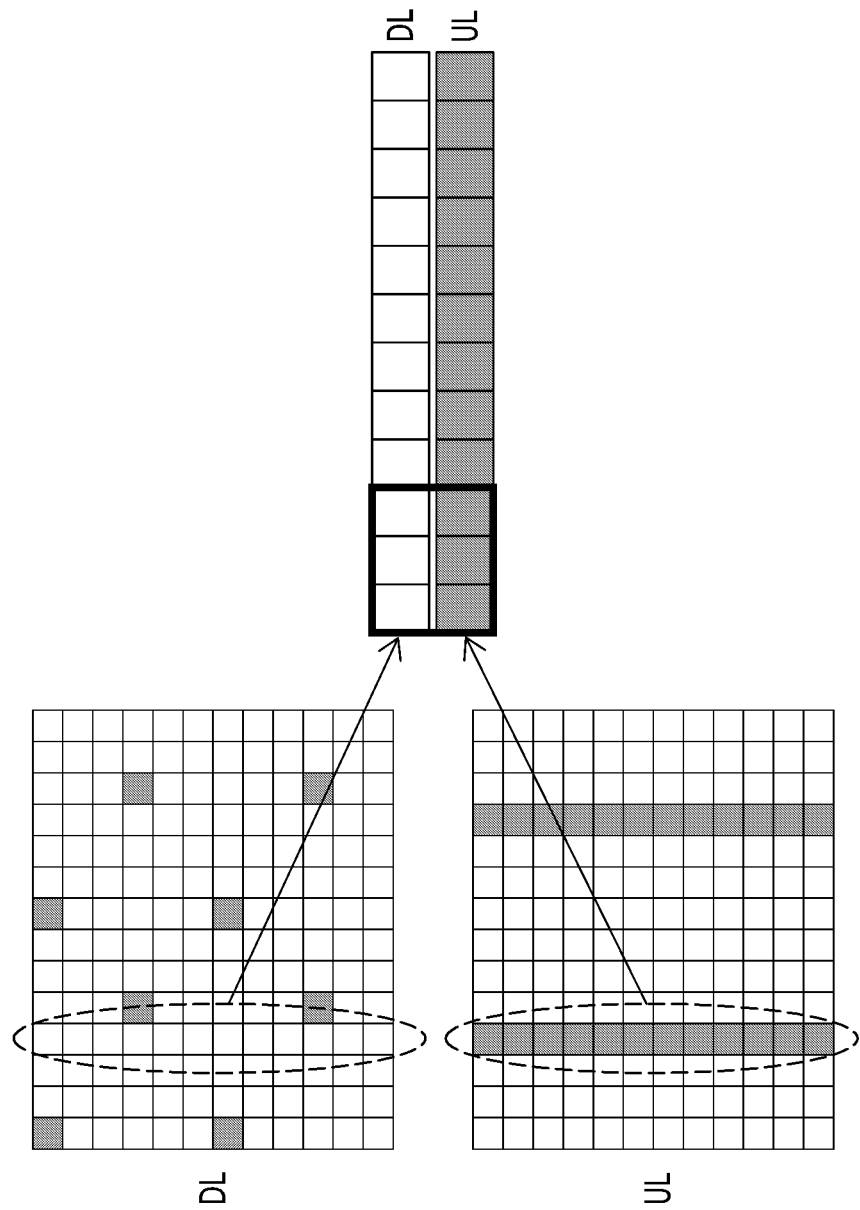
FIG. 8 illustrates a structure of downlink and uplink symbols according to a second exemplary embodiment of the present invention.

FIG. 8 illustrates a structure of downlink and uplink symbols according to a second exemplary embodiment of the present invention.

As shown in FIG. 8, a self-interference channel and an uplink channel are estimated by using a $4^{th}$ symbol in which a pilot signal exists in an uplink resource block and a $4^{th}$ symbol in a downlink resource block occupying the same time and frequency bandwidth. Herein, during the iterative channel estimation, since frequency selectivity of each channel is not so large, it is considered that each channel is constantly maintained for W subcarriers in a symbol indicated by a bold line in FIG. 8. In other words, it is assumed that conditions according to Equation 12 and Equation 13 for an uplink channel $H_U^{(n)[i]}(k)$ and a self-interference channel $H_{SI}^{(n)[i]}(k)$ in which $i^{th}$ iterative channel estimation is performed in a $k^{th}$ carrier of an $n^{th}$ resource block are satisfied.

$$H_{SI}^{(n)[i]}(k)=H_{SI}^{(n)[i]}(k+1)=\ldots=H_{SI}^{(n)[i]}(k+W-1) \quad \text{<Equation 12>}$$

$$H_U^{(n)[i]}(k)=H_U^{(n)[i]}(k+1)=\ldots=H_U^{(n)[i]}(k+W-1) \quad \text{<Equation 13>}$$

When it is considered that the conditions according to Equation 12 and Equation 13 are satisfied, a signal received in a corresponding subcarrier may be indicated as Equation 16 by using Equation 14 and Equation 15.

$$Y^{(n,4)[i]}(m)=Y^{(n,4)}(m)-\hat{H}_{SI}^{(n)[i-1]}(m)X_D^{(n,4)}(m) \quad \text{<Equation 14>}$$

$$H_{SI}^{(n)[i]}(m)=H_{SI}^{(n)}(m)-\hat{H}_{SI}^{(n)[i-1]}(m) \quad \text{<Equation 15>}$$

In other words, the signal received in the corresponding subcarrier may be indicated as Equation 16 by using Equation 14 and Equation 15.

$$\begin{pmatrix} Y^{(n,4)[i]}(k) \\ Y^{(n,4)[i]}(k+1) \\ \vdots \\ Y^{(n,4)[i]}(k+W-1) \end{pmatrix} = \quad \text{⟨Equation 16⟩}$$

$$\begin{pmatrix} X_D^{(n,4)}(k) & R_U^{(n,4)}(k) \\ X_D^{(n,4)}(k+1) & R_U^{(n,4)}(k+1) \\ \vdots & \vdots \\ X_D^{(n,4)}(k+W-1) & R_U^{(n,4)}(k+W-1) \end{pmatrix} \begin{pmatrix} H_{SI}^{(n)[i]}(k) \\ H_U^{(n)[i]}(k) \end{pmatrix} +$$

$$\begin{pmatrix} N^{(n,4)}(k) \\ N^{(n,4)}(k+1) \\ \vdots \\ N^{(n,4)}(k+W-1) \end{pmatrix}$$

Herein, $\hat{H}_{SI}^{(n)[i-1]}(m)$ indicates a self-interference channel of the finally estimated $m^{th}$ subcarrier in an iterative operation.

In addition, $Y^{[i]}(k)$, $X(k)$, $H^{[i]}(k)$, $N(k)$ may be defined as follows.

$$Y^{[i]}(k) = \begin{pmatrix} Y^{(n,4)[i]}(k) \\ Y^{(n,4)[i]}(k+1) \\ \vdots \\ Y^{(n,4)[i]}(k+W-1) \end{pmatrix} \quad \text{⟨Equation 17⟩}$$

$$X(k) = \begin{pmatrix} X_D^{(n,4)}(k) & R_U^{(n,4)}(k) \\ X_D^{(n,4)}(k+1) & R_U^{(n,4)}(k+1) \\ \vdots & \vdots \\ X_D^{(n,4)}(k+W-1) & R_U^{(n,4)}(k+W-1) \end{pmatrix} \quad \text{⟨Equation 18⟩}$$

$$H^{[i]}(k) = \begin{pmatrix} H_{SI}^{(n)[i]}(k) \\ H_U^{(n)[i]}(k) \end{pmatrix} \quad \text{⟨Equation 19⟩}$$

$$N(k) = \begin{pmatrix} N^{(n,4)}(k) \\ N^{(n,4)}(k+1) \\ \vdots \\ N^{(n,4)}(k+W-1) \end{pmatrix} \quad \text{⟨Equation 20⟩}$$

In this case, Equation 16 may be indicated as follows.

$$Y^{[i]}(k)=X(k)H^{[i]}(k)+N(k) \quad \text{<Equation 21>}$$

$Y^{[i]}(k)$ and $X(k)$ may be known by a receiver, and thus an estimate $\tilde{H}^{[i]}(k)$ obtained by using the zero-forcing method may be indicated as Equation 22.

$$\tilde{H}^{[i]}(k)=(X^H(k)X(k))^{-1}X^H(k)Y^{[i]}(k) \quad \text{<Equation 22>}$$

Figure 9:
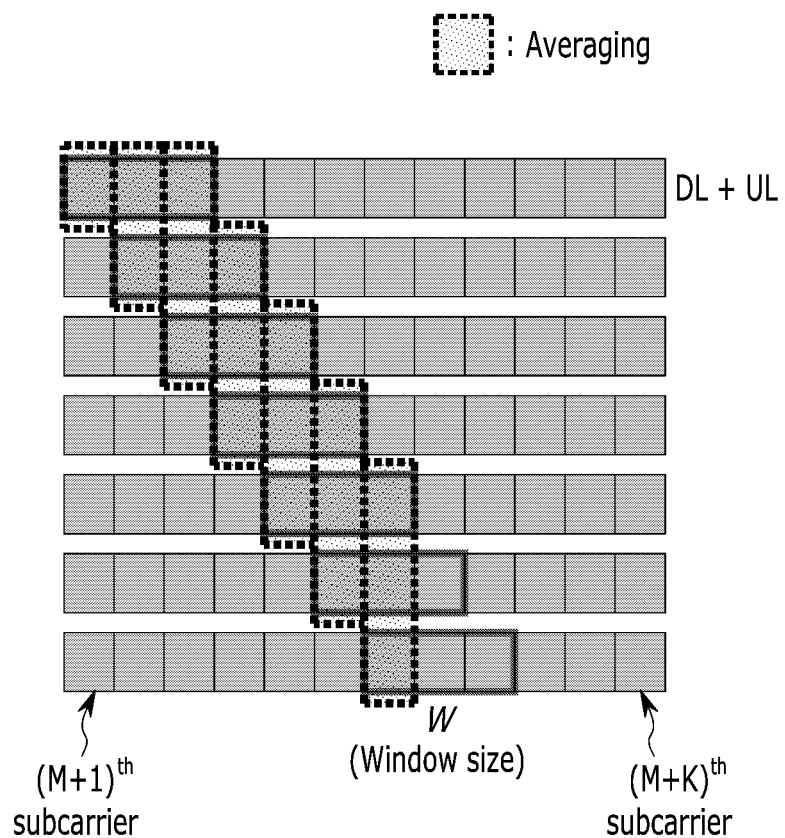
FIG. 9 illustrates an example of averaging of a self-interference channel and a downlink channel acquired according to the second exemplary embodiment of the present invention.

FIG. 9 illustrates an example of averaging of a self-interference channel and a downlink channel acquired according to the second exemplary embodiment of the present invention.

For example, as shown in FIG. 9, when a $4^{th}$ symbol in a downlink resource block that is allocated to one terminal corresponds to $(M+1)$ to $(M+K)^{th}$ subcarriers, a window having a size W passes from k=M+1 to k=M+K+1−W. Further, for each carrier, the window passes W times at a maximum.

When a channel $\tilde{H}^{[i]}(k)$ obtained from Equation 22 for a $j^{th}$ window including a $k^{th}$ subcarrier is indicated by using $\tilde{H}_j^{[i]}(k)$, the channel $\overline{H}^{[i]}(k)$ averaged for the $k^{th}$ subcarrier may be indicated as Equation 23.

$$\overline{H}^{[i]}(k) = \frac{1}{k-M}\sum_{j=1}^{k-M} \tilde{H}_j^{[i]}(k), \quad \text{⟨Equation 23⟩}$$

$$M+1 \leq k \leq M+W-1$$

$$\overline{H}^{[i]}(k) = \frac{1}{W}\sum_{j=1}^{W} \tilde{H}_j^{[i]}(k),$$

$$M+W \leq k \leq M+K-W+1$$

$$\overline{H}^{[i]}(k) = \frac{1}{M+K+1-k}\sum_{j=1}^{M+K+1-k} \tilde{H}_j^{[i]}(k),$$

$$M+K-W+2 \leq k \leq M+K$$

Next, when it is assumed that a self-interference channel vector $\overline{H}_{SI}^{[i]}=[\overline{H}_{SI}^{(n)[i]}(0)\ \overline{H}_{SI}^{(n)[i]}(1)\ \ldots\ \overline{H}_{SI}^{(n)[i]}(N-1)]^T$ averaged as follows from the obtained channel vector $\overline{H}^{[i]}(k)=[\overline{H}_{SI}^{(n)[i]}(k)\ \overline{H}_U^{(n)[i]}(k)]^T$ is constituted and a length of the self-interference channel in the time domain does not exceed the maximum L, the $i^{th}$ self-interference channel $\bar{h}_{SI}^{[i]}=[\bar{h}_{SI}^{(n)[i]}(0) \; \bar{h}_{SI}^{(n)[i]}(1) \ldots \bar{h}_{SI}^{(n)[i]}(L-1)]^T$ estimated in the time domain may be indicated as Equation 24. In addition, the upper limit L of the self-interference channel length in the actual system may be set to be equal to or smaller than the length of the CP.

$$\bar{h}_{SI}^{[i]}=\tilde{A}\bar{H}_{SI}^{[i]} \qquad \text{<Equation 24>}$$

Herein, $\tilde{A}$ may be indicated as Equation 25.

$$\tilde{A} = \begin{bmatrix} 1 & 1 & \ldots & 1 & 1 \\ 1 & e^{j2\pi/N} & \ldots & e^{j2\pi(N-2)/N} & e^{j2\pi(N-1)/N} \\ \vdots & \vdots & \ldots & \vdots & \vdots \\ 1 & e^{j2\pi(L-2)/N} & \ldots & e^{j2\pi(L-2)(N-2)/N} & e^{j2\pi(L-2)(N-1)/N} \\ 1 & e^{j2(L-1)/N} & \ldots & e^{j2\pi(L-1)(N-2)/N} & e^{j2\pi(L-1)(N-1)/N} \end{bmatrix} \quad \text{<Equation 25>}$$

Accordingly, the $i^{th}$ self-interference channel estimate $\hat{H}_{SI}^{[i]}$ of the frequency domain, noise of which is removed by limiting the channel length in the time domain, may be indicated as Equation 26.

$$\hat{H}_{SI}^{[i]}=[\hat{H}_{SI}^{(n)}(0)\hat{H}_{SI}^{(n)}(1) \ldots \hat{H}_{SI}^{(n)}(N-1)]^T=B\bar{h}_{SI}^{[i]}=B\tilde{A}\bar{H}_{SI}^{[i]} \qquad \text{<Equation 26>}$$

Herein, a matrix B is the same as given in Equation 8.

Such a channel estimation procedure is performed by a predetermined iteration number "I" or until a condition $\|\hat{H}_{SI}^{[i]}\|<\varepsilon$ is satisfied.

After an initial condition is set as $\hat{H}_{SI}^{[0]}=0$, and the channel estimation procedure is performed by the iteration number I until the iterative channel estimation completing condition is satisfied, the self-interference channel in the finally estimated frequency domain is indicated as Equation 27.

$$\hat{H}_{SI}=[\hat{H}_{SI}^{(n)}(0)\hat{H}_{SI}^{(n)}(1) \ldots \hat{H}_{SI}^{(n)}(N-1)]^T=\Sigma_{i=1}^{I}\hat{H}_{SI}^{[i]} \quad \text{<Equation 27>}$$

Accordingly, the uplink channel $\hat{H}_U^{(n)}(k)$ of the frequency domain estimated through the zero-forcing method by using Equation 27 and Equation 10 and the known uplink pilot $R_U^{(n,4)}(k)$ is acquired as Equation 28.

$$\hat{H}_U^{(n)}(k) = \frac{Y^{(n,4)}(k) - \hat{H}_{SI}^{(n)}(k)X_D^{(n,4)}(k)}{R_U^{(n,4)}(k)} \qquad \text{<Equation 28>}$$

Figure 10:
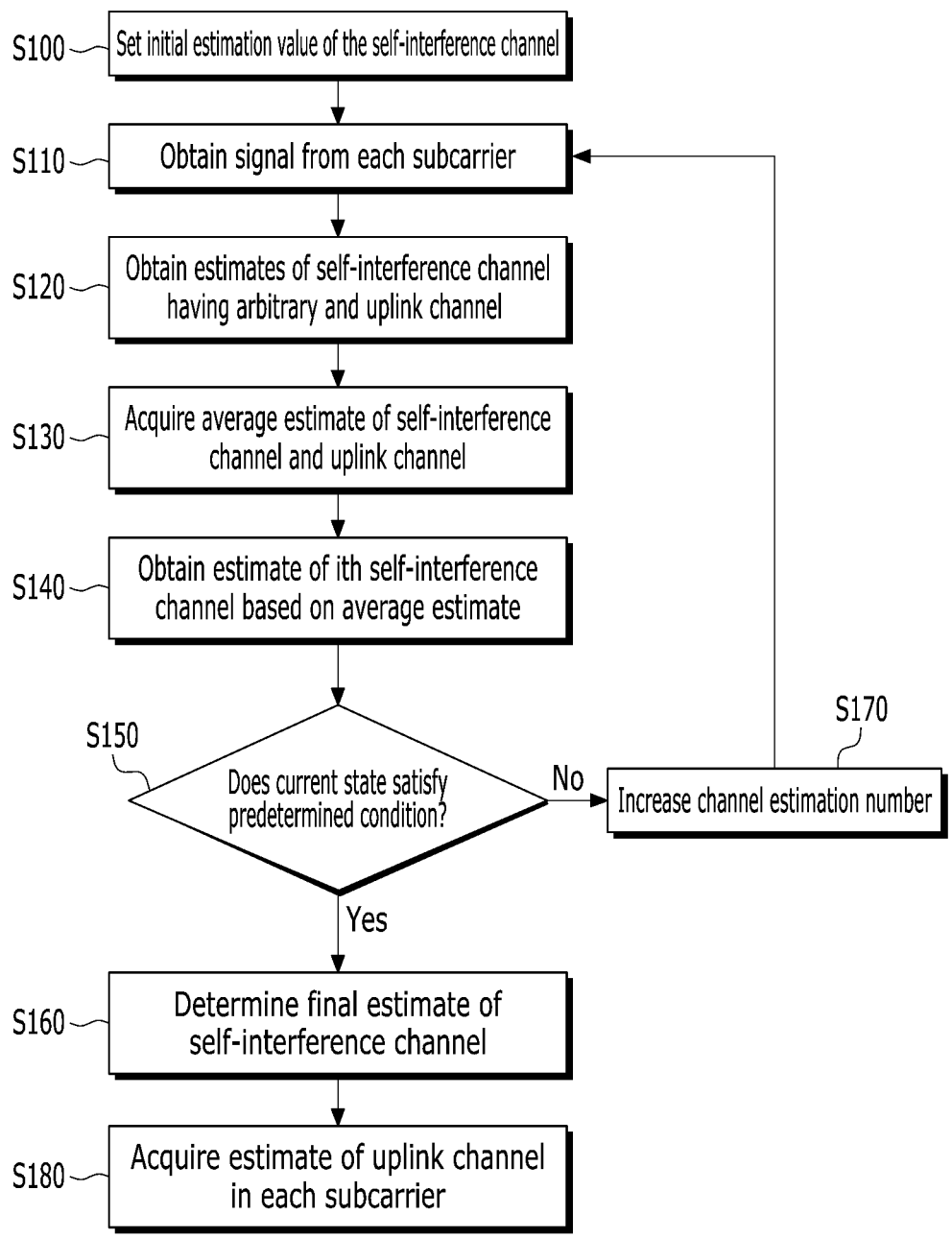
FIG. 10 is a flowchart illustrating a channel information acquiring method according to the second exemplary embodiment of the present invention.

FIG. 10 is a flowchart illustrating a channel information acquiring method according to the second exemplary embodiment of the present invention.

First, an initial estimation value $\hat{H}_{SI}^{[0]}$ of the self-interference channel is set as "0" (S100). Then, a signal received in each subcarrier is obtained (S110). In this case, the signal received in each subcarrier may be obtained by using Equation 10 and Equation 14.

Next, it is assumed that both an $i^{th}$ self-interference channel and an to uplink channel are the same in all subcarriers in a window having a predetermined size W, and the signal received in a corresponding subcarrier is obtained (S110). In this case, as described above, signals received according to Equation 21 may be obtained by using Equation 15 to Equation 20.

Next, estimates of the $i^{th}$ self-interference channel and the uplink channel in the corresponding window are obtained by using various channel estimation methods including the zero-forcing method (S120). In the case of using the zero-forcing method, the estimates of the $i^{th}$ self-interference channel and the uplink channel in the window may be obtained based on Equation 22.

Average estimates $\bar{H}^{[i]}(k)$ of the $i^{th}$ self-interference channel and the uplink channel in the corresponding window are acquired based on the channel estimate in the above step S110 while sequentially moving the window having the size W for each carrier (S130). In this case, the average estimates $\bar{H}^{[i]}(k)$ of the $i^{th}$ self-interference channel and the uplink channel in the corresponding subcarrier may be obtained by applying the channel estimates obtained in the above step to Equation 23.

Next, estimates $\hat{H}_{SI}^{[i]}$ of the $i^{th}$ self-interference channel for all subcarriers having reduced noise may be obtained by using the condition that the length of the self-interference channel length does not exceed L (S140). In this case, the estimate $\hat{H}_{SI}^{[i]}$ of the self-interference channel may be obtained by using Equation 26.

Then, when a current state satisfies a predetermined condition (S150), a final estimate of the self-interference channel is determined (S160), Specifically, when the channel estimation number satisfies the condition of the predetermined iteration number I or the condition of $\|\hat{H}_{SI}^{[i]}\|<\varepsilon$ is satisfied, the final estimate of the self-interference channel is determined like Equation 27. When the current state does not satisfy the predetermined condition, the channel estimation number is increased by 1 (S170), and it returns to the step. S110 to repeatedly perform the channel estimation.

When the final estimate of the self-interference channel is determined, the uplink channel is estimated by using, the final estimate of the self-interference channel and the known uplink pilot signal to obtain uplink channel information (S180). In this case, an estimate of the uplink channel for each subcarrier may be obtained based on Equation 28.

According, to the exemplary embodiments of the present invention, it is possible to accurately estimate desired reception channel information irrespective of the existence of the self-interference signal, in the system that simultaneously performs bi-directional transmission by using the same frequency bandwidth like in a polarization division duplex communication system. Therefore, it is possible not only to dramatically improve a total transmission capacity of the communication system but also to significantly reduce received information errors through acquiring precise bi-directional channel information by increasing frequency use efficiency by facilitating frequency overlap.

The above exemplary embodiments of the present invention are not to implemented only by the aforementioned method and apparatus, but may be implemented using a program for realizing a function corresponding to the construction of the exemplary embodiment of the present invention or a recording medium on which the program has been recorded. The implementation may be easily achieved by those having ordinary skill in the art to which the present invention pertains from the above exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An acquiring method of channel information in a polarization division duplex system, the method comprising:

receiving an uplink signal transmitted from a terminal, the uplink signal indicating that a null subcarrier is disposed in a first subcarrier overlapped with a second subcarrier including a downlink pilot signal;

estimating a self-interference channel by using a signal received from the null subcarrier;

removing a signal corresponding to the null subcarrier from the uplink signal; and acquiring channel information by estimating the uplink channel based on estimation results of the self-interference channel and a pilot signal included in the uplink signal from which the null subcarrier is removed, wherein a predetermined number of null subcarriers are additionally disposed at opposite sides with respect to the first subcarrier overlapped with the second subcarrier including the downlink pilot signal, and wherein when frequency selectivity of the self-interference channel is greater than a predetermined value and a temporal change amount of the self-interference channel is smaller than a predetermined amount, another null subcarrier is additionally disposed in a symbol in which the null subcarrier is disposed.

2. The acquiring method of claim 1, wherein a value of "0" is disposed in the null subcarrier.

3. The acquiring method of claim 1, wherein one null subcarrier is additionally disposed at each of the opposite sides.

4. The acquiring method of claim 1, wherein:

when the frequency selectivity of the self-interference channel is smaller than the predetermined value and the temporal change amount of the self-interference channel is greater than the predetermined amount, another null subcarrier is additionally disposed in a first symbol that is different from a second symbol in which the null subcarrier is disposed, and when the frequency selectivity of the self-interference channel is greater than the predetermined value and the temporal change amount of the self-interference channel is greater than the predetermined amount, another null subcarrier is additionally disposed in each of the second symbol in which the null subcarrier is disposed and the first symbol that is different from the second symbol in which the null subcarrier is disposed.

5. The acquiring method of claim 1, wherein, in a time domain, a length of the self-interference channel does not exceed a predetermined maximum length, and the maximum length has a value that is equal to or smaller than that of a cyclic prefix (CP) that is added into the uplink signal.

6. A receiving apparatus of acquiring channel information in a polarization division duplex system, the apparatus comprising:

a signal receiving processor configured to receive an uplink signal from a transmitting apparatus, the uplink signal indicating that a null subcarrier is disposed in a first subcarrier overlapped with a second subcarrier including a downlink pilot signal;

a self-interference channel estimation circuit configured to estimate a self-interference channel by using a signal received from the null subcarrier;

a null subcarrier remover circuit configured to remove a signal corresponding to the null subcarrier from the uplink signal; and a channel estimation and equalizer circuit configured to acquire channel information by estimating the uplink channel based on estimation results of the self-interference channel and a pilot signal included in the uplink signal from which the null subcarrier is removed, wherein a predetermined number of null subcarriers are additionally disposed at opposite sides with respect to the first subcarrier overlapped with the second subcarrier including the downlink pilot signal, and wherein when frequency selectivity of the self-interference channel is greater than a predetermined value and a temporal change amount of the self-interference channel is smaller than a predetermined amount, another null subcarrier is additionally disposed in a symbol in which the null subcarrier is disposed.

7. The receiving apparatus of claim 6, wherein the signal receiving processor includes:

an radio frequency (RF) circuit configured to receive uplink signals through a receiving antenna;

a first signal converter circuit configured to convert the received signals into digital signals;

a cyclic prefix (CP) remover circuit configured to remove CPs from the digital signals;

a second signal converter circuit configured to convert the CP-removed signals into parallel signals; and a discrete Fourier transform (DFT) circuit configured to convert the CP-removed digital signals into signals of a frequency domain through DFT, and to transmit signals corresponding to a null subcarrier among the uplink signals that are converted into the signals of the frequency domain, to the self-interference channel estimation circuit.

* * * * *